United States Patent
Ootaguro et al.

(10) Patent No.: US 7,525,335 B2
(45) Date of Patent: Apr. 28, 2009

(54) DISPLAY ELEMENT AND INSPECTING METHOD OF THE SAME

(75) Inventors: Hiroshi Ootaguro, Kanazawa (JP); Yoshio Iwai, Kanazawa (JP); Tetsuya Ohtomo, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 0 days.

(21) Appl. No.: 11/798,728

(22) Filed: May 16, 2007

(65) Prior Publication Data

US 2007/0296453 A1  Dec. 27, 2007

(30) Foreign Application Priority Data

May 18, 2006  (JP) .............................. 2006-138992

(51) Int. Cl.
  *G01R 31/00* (2006.01)
  *G02F 1/136* (2006.01)
(52) U.S. Cl. .............................. 324/770; 349/42; 349/43
(58) Field of Classification Search ................ 324/770; 349/42, 43
  See application file for complete search history.

(56) References Cited

U.S. PATENT DOCUMENTS 6,100,865 A * 8/2000 Sasaki .......................... 345/92
6,670,953 B1 * 12/2003 Ozawa ........................ 345/211

FOREIGN PATENT DOCUMENTS

| JP | 04-288588 | 10/1992 |
| JP | 2001-147650 | 5/2001 |
| JP | 2003-308056 | 10/2003 |
| JP | 2004-102260 | 4/2004 |

OTHER PUBLICATIONS

Notification of Reasons for Rejection from the Japanese Patent Office for Patent Application No. 2006-138992, mailed Jun. 25, 2008.

* cited by examiner

*Primary Examiner*—Ha Tran T Nguyen
*Assistant Examiner*—Karen M Kusumakar
(74) *Attorney, Agent, or Firm*—Finnegan, Henderson, Farabow, Garrett & Dunner, L.L.P.

(57) ABSTRACT

An inspection circuit is constructed by first inspection TFTs provided to one end sides of signal lines, and second inspection TFTs provided to the other end sides of the signal lines. By using both the first inspection TFTs and the second inspection TFTs, the driving capability can be secured while miniaturizing the first inspection TFTs and the second inspection TFTs. Therefore, the signal lines can be reliably inspected while saving the space for the inspection circuit.

4 Claims, 6 Drawing Sheets

DISPLAY ELEMENT AND INSPECTING METHOD OF THE SAME

INCORPORATION BY REFERENCE

The present application claims priority under 35 U.S.C. §119 to Japanese Patent Application No. 2006-138992 filed on May 18, 2006. The content of the application is incorporated herein by reference in its entirety.

FIELD OF THE INVENTION

The present invention relates to a display element having an inspection circuit provided to a signal wire.

BACKGROUND OF THE INVENTION

A liquid crystal panel as this type of display element is designed so as to have a panel main body including an array substrate, a counter substrate and a liquid crystal layer interposed therebetween, and the panel main body has a plurality of pixels arranged in a matrix form. Thin film transistors (TFT) as switching elements for driving pixels are arranged in connection with the pixels on an array substrate, and also gate lines and signal lines which correspond to scan lines as signal wires electrically connected to the gate electrodes and the source electrodes of these thin film transistors are arranged in a grid form. Furthermore, driver ICs as driving means are electrically connected to the end portions of the gate lines and the signal lines on the array substrate. That is, this liquid crystal panel is a so-called COG (Chip On Glass) type.

The process of manufacturing the liquid crystal panel as described above contains a step of inspecting wire breaking or short-circuiting of the gate lines or the signal lines, and an inspection circuit having inspection TFTs as inspection switching elements is provided to the end portions of the gate lines and the signal lines.

In this inspecting step, the inspection TFTs are turned on to supply a predetermined inspection signal to the gate lines and the signal lines, and the turn-on state of the pixels are checked visually, whereby the wire breaking or the short-circuiting of the gate lines or the signal lines can be detected.

The wire breaking or short-circuiting of the gate signals and the signal lines which are inspected in the inspecting step as described above is liable to occur in the vicinity of driver IC mounting portions corresponding to connection portions to the driver ICs because the vicinities of the driver IC mounting portions are not covered by a counter substrate. Therefore, when the inspection TFTs are disposed at the opposite end portion to the driver IC and an inspection signal is supplied from the opposite end portion, the inspection signal passes through the gate line or the signal line to the opposite end portion, and thus the pixel is turned on as in the case of the normal state. Accordingly, particularly, it is not easy to detect the wire breaking.

Therefore, as shown in Japanese Laid-Open Patent Publication NO. 2004-102260, it is preferable that the inspection TFTs are disposed at the driver IC mounting portion side and an inspection signal is supplied from the driver IC side.

However, driver ICs have been recently miniaturized in accordance with the requirement of reducing the frame size, and it has not been easy to secure a sufficient space in which the inspection TFTs are disposed.

Therefore, it has been required to miniaturize the inspection TFTs. As a result, the driving capability of the inspection TFTs is lowered, and image quality abnormalities such as unevenness or the like occur when the liquid crystal panel is inspected, which may induce erroneous decision.

The present invention has been implemented in view of the foregoing point, and has an object to provide a display element that can reliably inspect signal wires while saving the space of an inspection circuit.

SUMMARY OF THE INVENTION

A display element according to the present invention includes a plurality of pixels, a plurality of switching elements for driving the respective pixels, a plurality of signal wires for transmitting signals to the switching elements, and an inspection circuit that is provided to the signal wires to inspect these signal wires, wherein the inspection circuit includes first inspection switching elements that are provided to at least one end side of the signal wires and can supply an inspection signal to the signal wires in a turn-on state, and second inspection switching elements that are provided to at least the other end side of the signal wires. The inspection circuit for inspecting the signal wires is constructed by the first inspection switching elements provided to at least one end side of the signal wires, and the second inspection switching elements provided to at least the other end side of the signal wires, whereby the driving capability can be secured while the first inspection switching elements and the second inspection switching elements are respectively miniaturized by using both the first inspection element and the second inspection switching element, so that the signal wires can be reliably inspected while saving the space of the inspection circuit.

DETAILED DESCRIPTION OF THE PREFERRED EMBODIMENTS

The construction of a display element according to a first embodiment of the present invention will be described with reference to FIGS. 1 and 2.

Figure 1:
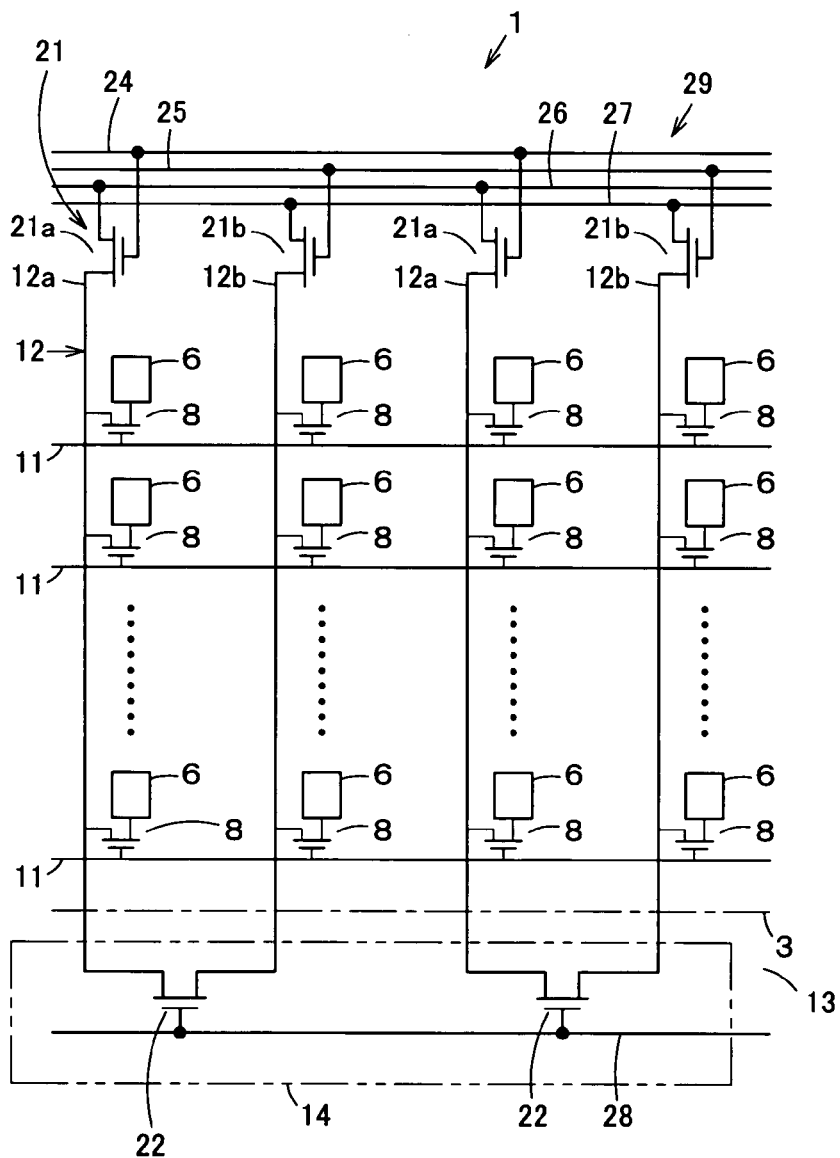
FIG. 1 is a circuit diagram showing a display element according to a first embodiment of the present invention.
Figure 2:
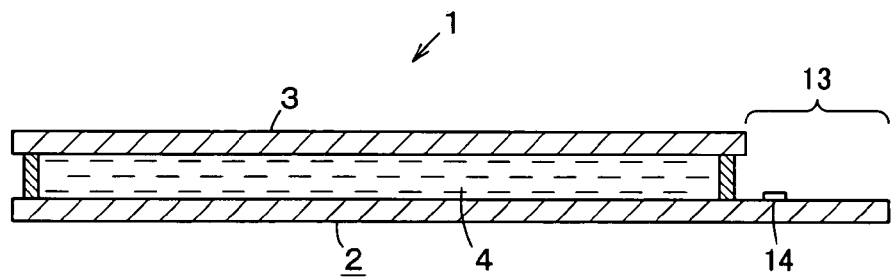
FIG. 2 is a cross-sectional view showing the display element.

In FIGS. 1 and 2, reference numeral 1 represents an active matrix type liquid crystal panel which is a liquid crystal element as a display element, and this liquid crystal panel 1 is constructed by disposing a substantially rectangular flat plate type array substrate 2 as a substrate and a substantially rectangular flat plate type counter substrate 3 as a substrate so that they face each other, and interposing a liquid crystal layer 4 between these substrates 2 and 3. An effective display area (not shown) which is rectangular in plan view is formed at the center portion of the liquid crystal panel 1, and a plurality of pixels 6 are arranged in a matrix form of M rows×N columns in the effective display area, for example. Furthermore, in each of the pixels 6 are arranged a pixel electrode as a display electrode, an auxiliary capacitor which is a pixel auxiliary capacitor as a storage capacitor, and a thin film transistor 8 (hereinafter referred to as TFT 8) as a switching element.

Furthermore, a plurality of gate lines 11 corresponding to scan lines as signal wires are arranged parallel to one another on the surface of the array substrate 2 so as to extend in the right and left direction shown in FIG. 1 of the array substrate 2, and a plurality of signal lines 12 as signal wires are arranged parallel to one another so as to extend in the vertical direction shown in FIG. 1 of the array substrate 2. Accordingly, the gate lines 11 and the signal lines 12 are wired in a matrix form as a grid form so as to cross one another on the array substrate 2. The pixel electrode, the auxiliary capacitor and the TFT 8 are provided every pixel 6 in connection with each cross point between the gate line 11 and the signal line 12, and the gate line 11 and the signal line 12 are electrically connected to the gate electrode of each TFT 8 and the source electrode of each TFT 8, respectively.

A plurality of driver ICs 14 each having a slender rectangular shape as driving means are arranged at a frame portion 13 outside the effective display area of the array substrate 2. One end portions of each gate line 11 and each signal line are electrically connected to the driver ICs 14. These driver ICs 14 supply pixel signals to the respective signal lines 12 in synchronization with the timing of turning on/off the TFT 8 on the basis of scan signals supplied to the respective gate lines 11, thereby driving predetermined pixels 6 and thus displaying a predetermined image in the effective display area.

A first inspection thin film transistor 21 (hereinafter referred to as first inspection TFT 21) which is an en bloc spot pixel thin film transistor as a first inspection switching element is electrically connected to the opposite side to one end side of the signal line 12, that is, a side of the signal line 12 which is electrically connected to the driver IC 14, that is, the upper end side shown in FIG. 1. Furthermore, a second inspection thin film transistor 22 (herein after referred to as second inspection TFT 22) as a second inspection switching element is electrically connected between the other end sides of the adjacent signal lines 12, that is, the driver IC 14 sides of the adjacent signal lines 12.

The first inspection TFT 21 is used to supply an inspection signal to the signal line 12 in a turn-on state, and the gate electrode thereof is electrically connected to the first inspection gate line 24 as the first inspection input line or the second inspection gate line 25 as the second inspection input line, the source electrode thereof is electrically connected to the first inspection signal line 26 or the second inspection signal line 27, and each drain electrode is electrically connected to the signal line 12.

Here, with respect to the first inspection TFTs 21, the gate electrodes of the adjacent first inspection TFTs 21 are electrically connected to the different gate lines 24 and 25, and the source electrodes of the adjacent first inspection TFTs 21 are electrically connected to the different inspection signal lines 26 and 27. That is, the signal line 12 on each 2n-1 column (n represents a natural number 1 or above) is electrically connected to the drain electrode of the first inspection TFT 21 whose gate electrode is electrically connected to the first inspection gate line 24 and whose source electrode is electrically connected to the first inspection signal line 26, and the signal line 12 on each 2n column (n represents a natural number 1 or above) is electrically connected to the drain electrode of the first inspection TFT 21 whose gate electrode is electrically connected to the second inspection gate line 25 and whose source electrode is electrically connected to the second inspection signal line 27. In the following description, each first inspection TFT 21 whose gate electrode is electrically connected to the first inspection gate line 24 and whose source electrode is electrically connected to the first inspection signal line 26 is set as a first inspection TFT 21a, each first inspection TFT 21 whose gate electrode is electrically connected to the second inspection gate line 25 and whose source electrode is electrically connected to the second inspection signal line 27 is set as a first inspection TFT 21b, and the signal lines 12 which are electrically connected to the drain electrodes of the TFTs 21a, 21b are set as signal lines 12a, 12b, respectively.

Furthermore, an image signal as an inspection signal is input to each of the inspection signal lines 26 and 27. Signal lines of red (R), green (G) and blue (B) are required for color display to each of the inspection signal lines 26 and 27, however, for convenience sake, each inspection signal line is represented by one line in the drawings.

The second inspection TFTs 22 are arranged at the lower portion of the driver IC 14. The gate electrodes of the second inspection TFTs 22 are electrically connected to an inspection gate line 28 as an inspection input line. In these second inspection TFTs 22, the source electrode and the drain electrode of each second inspection TFT 22 are electrically connected to the adjacent signal lines 12. In this embodiment, the source electrode is electrically connected to the signal line 12a, and the drain electrode is electrically connected to the signal line 12b. Accordingly, the second inspection TFT 22 short-circuits the signals 12a and 12b when it is turned on.

The inspection circuit 29 for inspecting the wire breaking or short-circuiting of the signal lines 12 is constructed by the TFTs 21 and 22, the gate lines 24, 25 and 28 and the respective inspective signal lines 26 and 27, etc. In particular, the inspection circuit 29 can detect the wire breaking or short-circuiting of the signal lines 12 at the end portions thereof which are located at the driver IC 14 side and project to the frame portion 13.

Next, the operation of the first embodiment will be described.

When normal spot pixel inspection is carried out, in a state that the gate lines 11 are set to "High" to turn on all the TFTs 8, each gate line 24, 25 is set to "High" to turn on each TFT 21, and also the inspection gate line 28 is set to "Low" to turn off each TFT 22, whereby the driver IC 14 side of each signal line 12a, 12b is set to a release state, that is, an open state, and a predetermined image signal is input to each inspection signal line 26, 27.

Subsequently, when the wire breaking of the signal lines 12 is inspected, the first inspection gate line 24 is set to "High" to turn on the first inspection TFT 21a, and the second inspection gate line 25 is set to "Low" to turn off the first inspection TFT 21b.

At this time, if the signal lines 12a and 12b are normal, all the pixels 6 are normally turned on. If a wire breaking section exists in the signal lines 12a and 12b, pixels 6 connected to a signal line extending from the wire breaking section to one end of the signal line 12b are not turned on, and thus this wire breaking section can be specified.

Furthermore, the inspection gate line 28 is set to "High" to turn on the second inspection TFT 22, thereby making one end of the signal line 12b open and forming a signal line which extends continuously in a loop shape through the first inspection signal line 26, the first inspection TFT 21a, the signal line 12a, the second inspection TFT 22, the inspection gate line 28, and the signal line 12b, and a predetermined image signal is input to the first inspection signal lines 26.

At this time, if the signal lines 12a and 12b are normal, only pixels 6 connected to TFTs 8 which are electrically connected to the signal line 12a are turned on. Accordingly, if a short-circuiting section exists in the signal lines 12a and 12b, pixels 6 connected to TFTs 8 which are electrically connected to the signal line 12b are also turned on, so that the short-circuit section can be specified.

As described above, according to the first embodiment, the inspection circuit 29 is constructed by the first inspection TFTs 21 provided to one end sides of the signal lines 12 and the second inspection TFTs 22 provided to the other end sides of the signal lines 12, whereby the driving capability can be secured while miniaturizing the first inspection TFTs 21 and the second inspection TFTs 22 by using both the first inspection TFTs 21 and the second inspection TFTs 22. Therefore, the signal lines 12 can be reliably inspected while saving the space for the inspection circuit 29.

That is, in the conventional art in which the inspection TFTs are disposed at only the driver IC side of the signal lines, etc., the disposing space of the driver IC is reduced in connection with the slim design of the driver IC, so that the inspection TFTs are reduced in size and thus the driving force is lowered. Therefore, a variation among the inspection TFTs may cause an abnormality in image quality such as unevenness or the like when the liquid crystal panel is inspected, and thus cause erroneous decision. On the other hand, according to the present embodiment, by dividing the inspection circuit 29 into a plurality of TFTs 21 and 22, sufficient driving force can be secured even when each of the TFTs 21 and 22 is designed to be small in size, and unevenness, etc., does not occur during the inspecting step of the liquid crystal panel 1. Therefore, the erroneous decision on wire breaking, short-circuiting or the like of the signal lines 12 can be prevented, and the slim design of the driver IC 14, that is, the narrowing of the frame of the liquid crystal panel 1 can be easily performed.

The first inspection TFTs 21 to which a predetermined image signal is input are provided at the opposite side to the driver IC 14 side, and the second inspection TFTs 22 are arranged so that the signal line 12a electrically-connected to the first inspection TFT 21a and the signal line 12b electrically-connected to the first inspection TFT 21b are short-circuited to each other in a turn-on state, whereby a signal line for inputting an image signal to the second inspection TFTs 22 disposed at the driver IC 14 side is not required, and also the number of the second inspection TFTs 22 disposed at the driver IC 14 side can be reduced to half the number of the first inspection TFTs 21. Accordingly, the space at the driver IC 14 side of the inspection circuit 29 can be reduced.

In particular, when an inspecting image is color-displayed, there are a plurality of signal lines for inputting an image signal corresponding to this image, and thus it is not required to provide the signal lines described above at the driver IC 14 side. The space at the driver IC 14 side can be reliably saved.

Furthermore, by connecting the signal lines 12a and 12b to each other through the second inspection TFT 22 and turning on/off the second inspection TFT 22, a wire constructed by the first inspection signal line 26, the first inspection TFT 21a, the signal line 12a, the second inspection TFT 22, the inspection gate line 28 and the signal line 12b is formed or released, whereby the wire breaking and the short-circuiting of the signal lines 12 can be reliably and efficiently detected. In particular, the driver IC 14 side of the signal line 12 projects to the frame portion 13 in plan view, and it is not covered by the counter substrate 3, so that it is liable to be damaged in the manufacturing process. Therefore, by forming and releasing the wire, the wire breaking and the short-circuiting of the signal lines 12a and 12b in the vicinity of the driver IC 14 can be reliably detected, and thus the reliability of the product can be enhanced.

Figure 3:
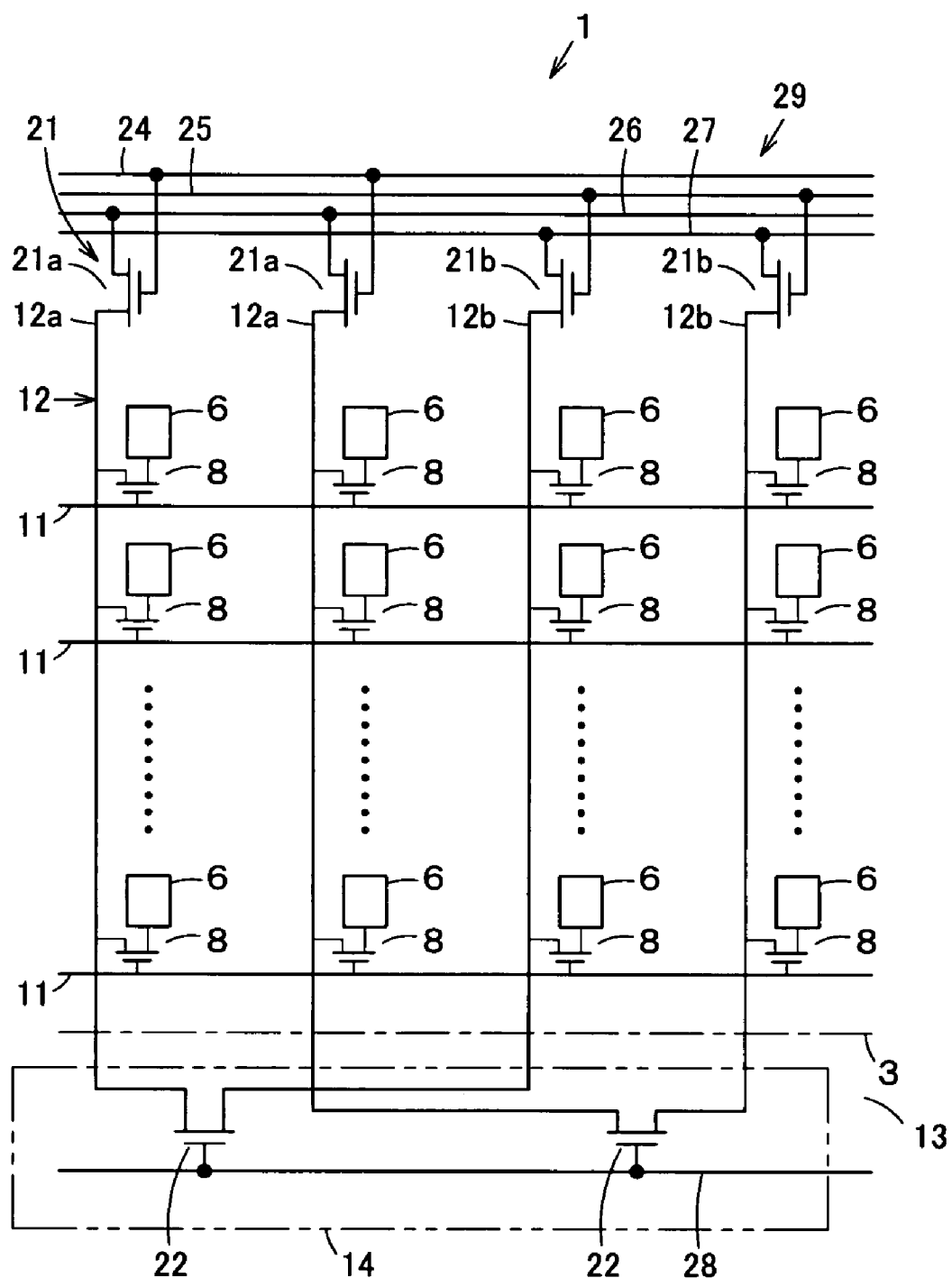
FIG. 3 is a circuit diagram showing a display element according to a second embodiment of the present invention.

In the first embodiment, as in the case of the second embodiment shown in FIG. 3, it is possible that the drain electrodes of the first inspection TFTs 21a are electrically connected to the signal lines 12 on 4n-3 columns (n represents a natural number 1 or above) and 4n-2 columns (n represents a natural number 1 or above), and the drain electrodes of the first inspection TFTs 21b are electrically connected to the signal lines 12 on 4n-1 columns (n represents a natural number 1 or above) and 4n columns (n represents a natural number 1 or above), and the second inspection TFTs 22 are electrically connected between the signal lines 12a and 12b, that is, every other signal line 12, in other words, between odd-numbered columns and between even-numbered columns.

Likewise, the drain electrodes of the first inspection TFTs 21a are electrically connected to the signal lines 12a of a plurality of columns of adjacent three or more columns, and the drain electrodes of the first inspection TFTs 21b are electrically connected to the signal lines 12b of the other plurality of columns of adjacent three or more columns, whereby the second inspection TFTs 22 are electrically connected between the signal lines 12a and 12b every three columns, every four columns, etc. In this case, the same operation and effect as the second embodiment can be achieved.

Furthermore, in each of the above embodiments, even when each TFT 21a, 21b is arbitrarily disposed, if the numbers of the TFTs 21a and 21b are equal to each other, the same operation and effect can be achieved by disposing the second inspection TFTs 22 so that the signal lines 12a and 12b are electrically connected to each other by each second inspection TFT 22.

Figure 4:
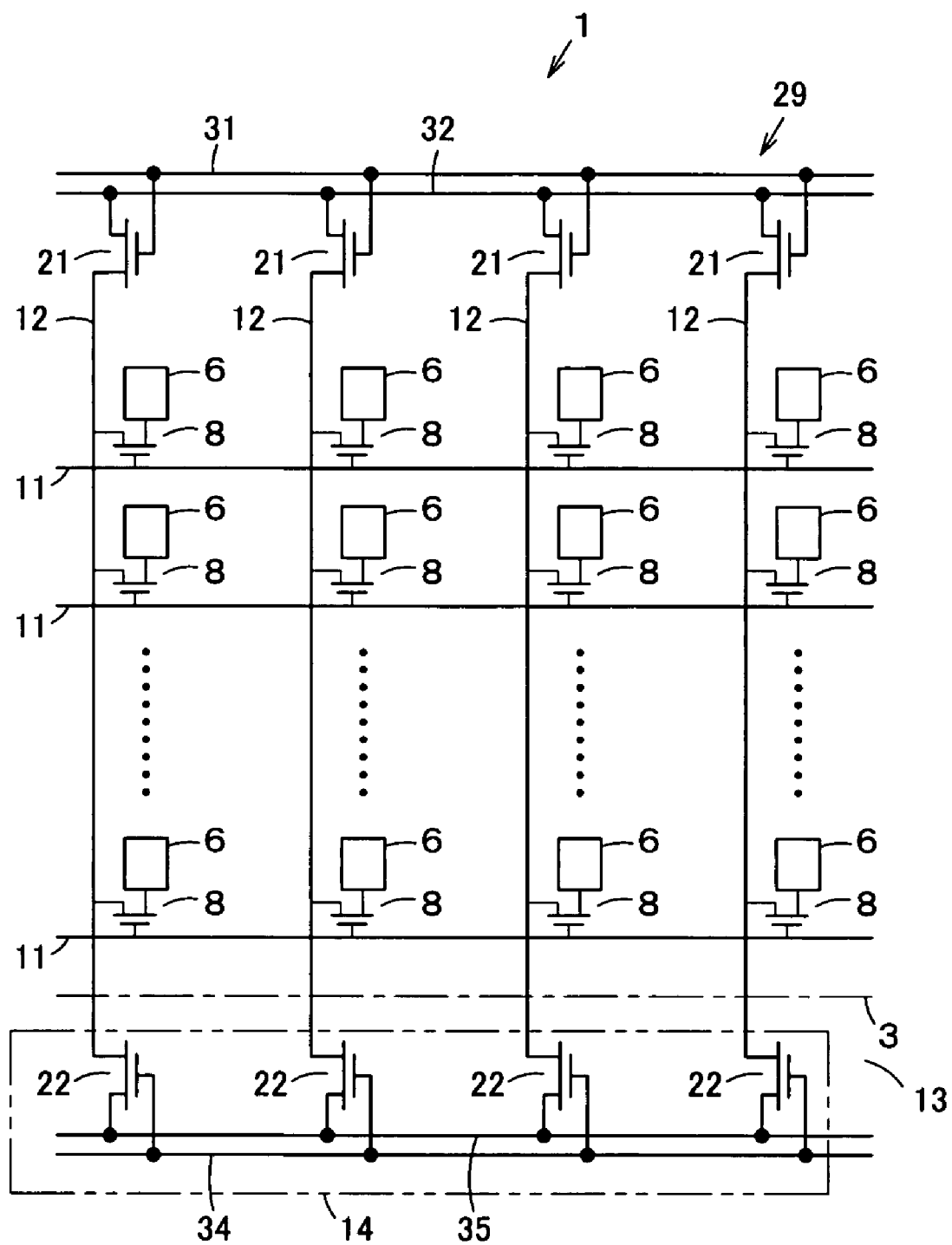
FIG. 4 is a circuit diagram showing a display element according to a third embodiment of the present invention.

Next, a third embodiment will be described with reference to FIG. 4. The same construction and operation as the above-described embodiments are represented by the same reference numerals, and a description thereof is omitted.

In the third embodiment, the first inspection TFTs 21 and the second inspection TFTs 22 are disposed on all the signal lines 12.

That is, with respect to the first inspection TFTs 21, the gate electrodes are electrically connected to a first inspection gate line 31 as a common first inspection scan line, the source electrodes are electrically connected to a first inspection signal line 32 as a common first inspection signal input line, and the drain electrodes are electrically connected to the signal lines 12.

Furthermore, with respect to the second inspection TFTs 22, the gate electrodes are electrically connected to a second inspection gate line 34 as a common second inspection scan line, the source electrodes are electrically connected to a second inspection signal line 35 as a common second inspection signal input line, and the drain electrodes are electrically connected to the signal lines 12.

Signal lines of red (R), green (G) and blue (B) or the like for color display are necessary for each of the inspection signal lines 32 and 35. However, for convenience sake, each inspection signal line is represented by one line in the figures.

While various kinds of inspection are carried out, by setting each gate line 31, 34 to "High" to turn on each of the TFTs 21 and 22 in a state that the gate lines 11 are set to "High" to turn on all TFTs 8 and also inputting a predetermined image signal to each of the inspection signal lines 32 and 35, the wire breaking or short-circuiting state can be properly inspected by checking the turn-on state of each pixel 6.

As a result, the same operation and effect as the above-described embodiments can be achieved, and by providing each TFT 21, 22 to all the signal lines 12, the driving force can be secured while reducing the size of each TFT 21, 22.

By providing TFTs 21, 22 at both the ends of the signal line 12 and 12, the wire breaking and short-circuiting of the signal line 12 can be more minutely inspected, and also it is unnecessary to form a loop-shaped signal line between adjacent signal lines 12, so that the number of signal lines for inputting a predetermined image signal to the each of TFTs 21 and 22 can be reduced.

Figure 5:
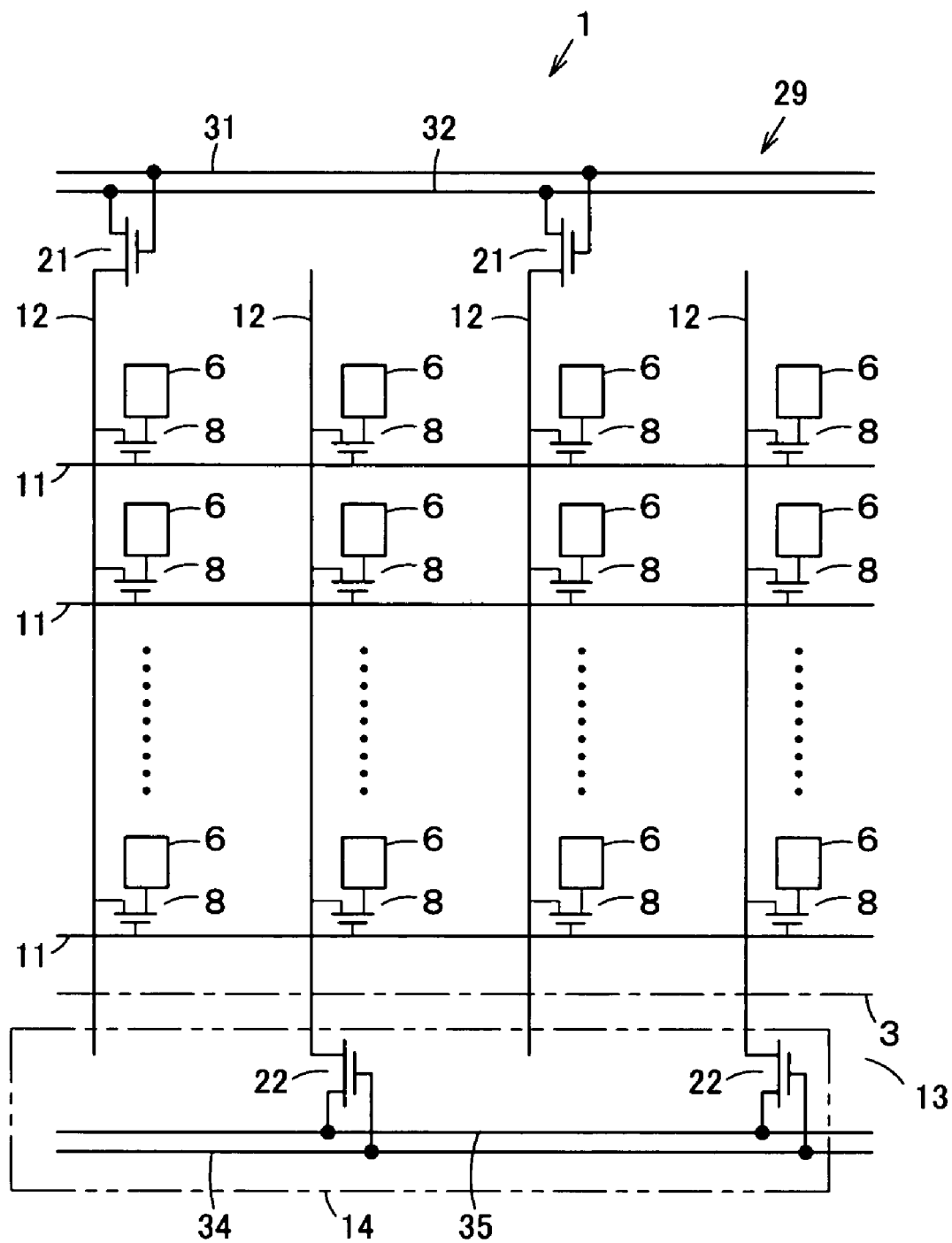
FIG. 5 is a circuit diagram showing a display element according to a fourth embodiment of the present invention.

In the third embodiment, the same operation and effect can be achieved by the construction that the first inspection TFT 21 and the second inspection TFT 22 are provided to different signal lines 12, and also the number of the TFTs 21 and 22 can be reduced to half in the third embodiment. Therefore, it is unnecessary to needlessly reduce the size of each TFT 21, 22, and sufficient driving force of each TFT 21, 22 can be secured while satisfying the slim design. At this time, by alternately providing the first inspection TFT 21 and the second inspection TFT 22 to different signal lines 12 as in the case of a fourth embodiment shown in FIG. 5, space can be equally allocated to each of the TFTs 21 and 22, and thus the size of each of the TFTs 21 and 22 can be secured at maximum.

Figure 6:
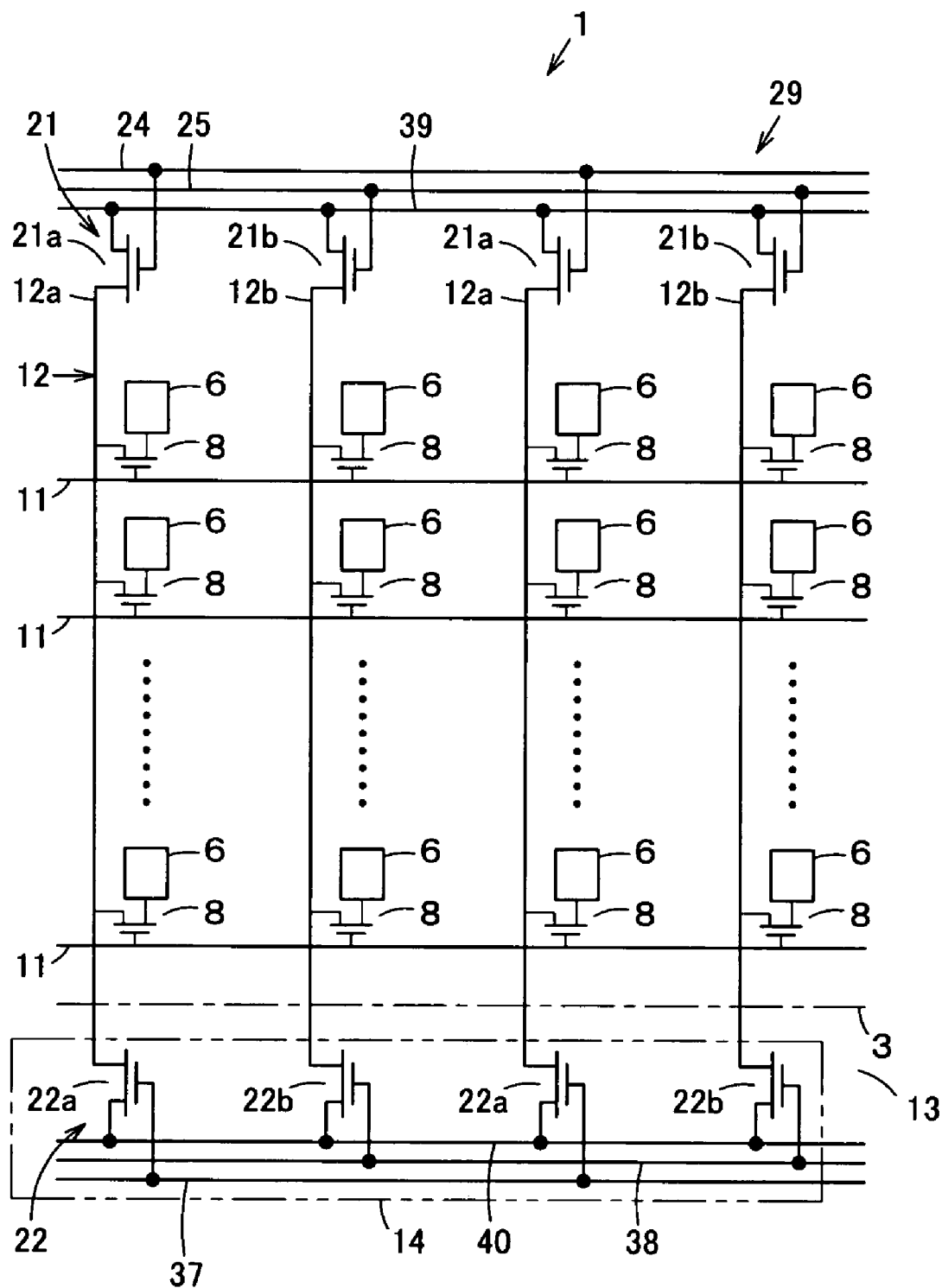
FIG. 6 is a circuit diagram showing a display element according to a fifth embodiment of the present invention.

Next, a fifth embodiment will be described with reference to FIG. 6. The same construction and operation as the above-described embodiments are represented by the same reference numerals, and a description thereof is omitted.

According to the fifth embodiment, the drain electrode of each second inspection TFT 22 is electrically connected to each signal line 12a, 12b as in the first embodiment.

The gate electrode of the second inspection TFT 22 is electrically connected to a third inspection gate line 37 as a third inspection input line or a fourth inspection gate line 38 as a fourth inspection input line.

Here, the gate electrodes of the adjacent second inspection TFTs 22 are electrically connected to the different gate lines 37 and 38. That is, the signal line 12a is electrically connected to the drain electrode of the second inspection TFT 22 whose gate electrode is electrically connected to the third inspection gate line 37, and the signal line 12b is electrically connected to the drain electrode of the second inspection TFT 22 whose gate electrode is electrically connected to the fourth inspection gate line 38. In the following description, the second inspection TFT 22 whose gate electrode is electrically connected to the third inspection gate line 37 is set as a second inspection TFT 22a, and the second inspection TFT 22 whose gate electrode is electrically connected to the fourth inspection gate line 38 is set as a second inspection TFT 22b.

With respect to the first inspection TFTs 21a and 21b, the source electrodes thereof are electrically connected to a common inspection signal line 39. With respect to the second inspection TFTs 22a and 22b, the source electrodes thereof are electrically connected to a common inspection signal line 40.

Signal lines of red (R), green (G) and blue (B) or the like for color display are required for each of the inspection signal lines 39 and 40. However, for convenience sake, each inspection signal line 39, 40 is represented by one line in the figures.

When various kinds of inspection are carried out, by properly setting each of the inspection gate lines 24, 25, 37 and 38 to "High" or "Low" and inputting a predetermined image signal to each inspection signal line 39, 40, the wire breaking or short-circuiting can be inspected on the basis of the turn-on state of the pixels 6.

Furthermore, by providing the TFTs 21a, 22a and the TFTs 21b, 22b to both the ends of the signal lines 12a, 12b, respectively, the size of the respective TFTs 21 and 22 can be further reduced while securing sufficient driving force.

In the fifth embodiment, the arrangement of the respective TFTs 21a, 21b, 22a and 22b may be arbitrarily set. For example, as in the case of the second embodiment, the drain electrodes of the respective TFTs 21a, 22a may be electrically connected to the signal lines 12 on 4n-3 columns (n represents a natural number 1 or above) and 4n-2 columns (n represents a natural number 1 or above), and the drain electrodes of the TFTs 21b, 22b may be electrically connected to the signal lines 12 on 4n-1 columns (n represents a natural number 1 or above) and 4n columns (n represents a natural number 1 or above).

Figure 7:
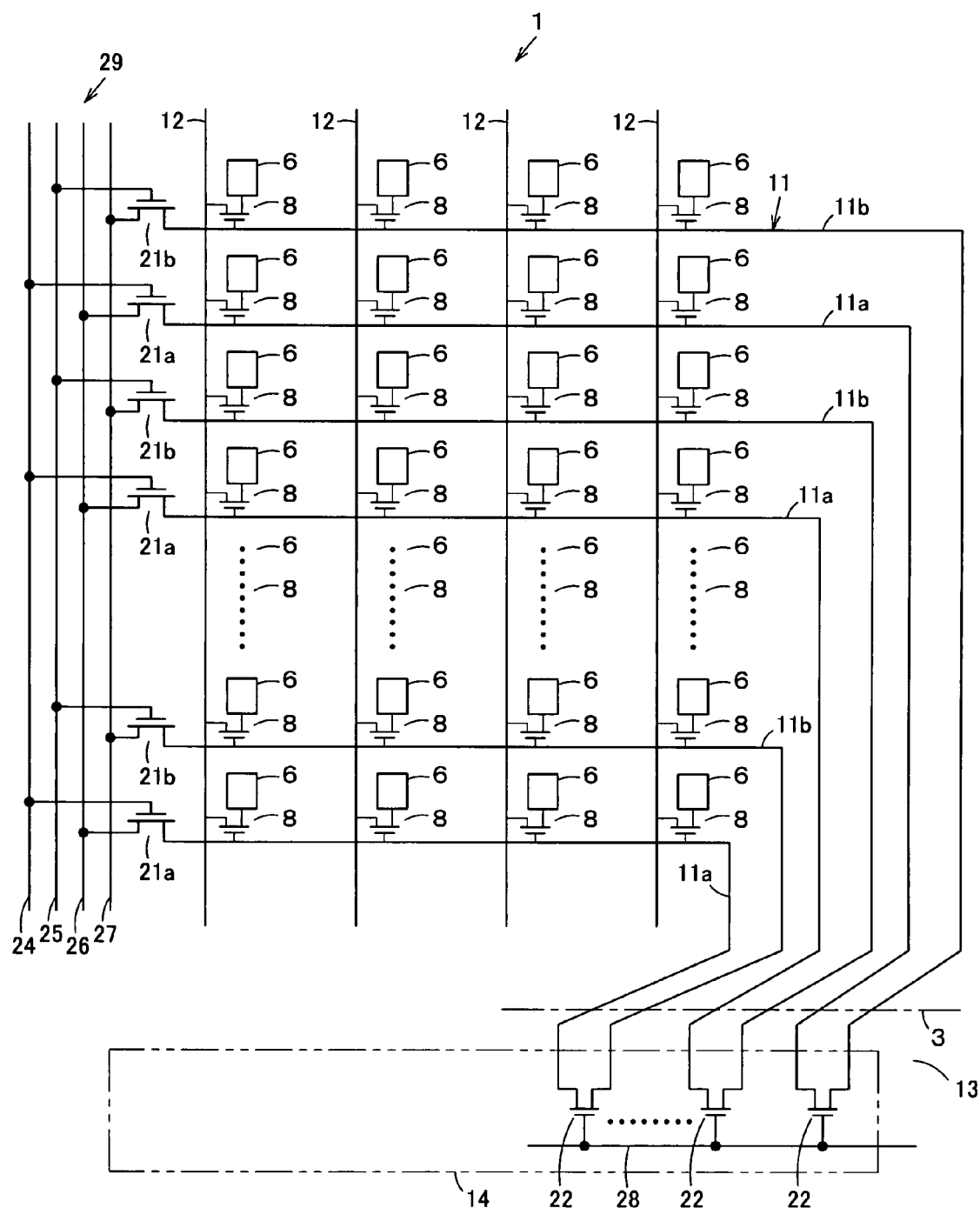
FIG. 7 is a circuit diagram showing a display element according to a sixth embodiment of the present invention.

Next, a sixth embodiment will be described with reference to FIG. 7. The same construction and operation as the above-described embodiments are represented by the same reference numerals, and a description thereof is omitted.

In this sixth embodiment, the construction of the first embodiment is applied to the gate line 11 which is a scan line as a signal wire.

That is, with respect to the first inspection TFTs 21a, the gate electrodes are electrically connected to the first inspection gate line 24, the source electrodes are electrically connected to the first inspection signal line 26, and the drain electrodes are electrically connected to the gate lines 11 of 2m-1 lines (m represents a natural number 1 or above). Furthermore, with respect to the first inspection TFTs 21b, the gate electrodes are electrically connected to the first inspection gate line 25, the source electrodes are electrically connected to the second inspection signal line 27, and the drain electrodes are electrically connected to the gate lines 11 of 2m lines (m represents a natural number 1 or above).

In the following description, the gate lines 11 which are electrically connected to the drain electrodes of the TFTs 21a, 21b are set as gate lines 11a, 11b, respectively.

Furthermore, the second inspection TFTs 22 are electrically connected between the respective gate lines 11a and 11b at the lower portion of the driver IC 14.

When normal spot pixel inspection is carried out, by setting the respective gate lines 24 and 25 to "High" to turn on the respective TFTs 21 and setting the inspection gate line 28 to "Low" to turn off the respective TFTs 22, the driver IC 14 side of each of the gate lines 11a and 11b is set to a release state, that is, an open state, a predetermined on/off signal is input as an inspection signal to the inspection signal lines 26 and 27 in the above state, and then a predetermined image signal is input to each signal line 12.

Subsequently, when wire breaking of the gate lines 11 is inspected, the first inspection gate line 24 is set to "High" to turn on the first inspection TFTs 21a, the second inspection gate line 25 is set to "Low" to turn off the first inspection TFTs 21b, and the inspection gate line 28 is set to "High" to turn on the second inspection TFTs 22, thereby forming a signal line which extends continuously in a loop shape through the first inspection signal line 26, the first inspection TFT 21a, the gate line 11a, the second inspection TFT 22, the inspection gate line 28, the gate line 11b, the first inspection TFT 21b and the second inspection signal line 27, and a predetermined image signal is input to these inspection signal lines 26 and 27.

At this time, if the gate lines 11a and 11b are normal, all the TFTs 8 are turned on, and the pixels 6 are normally turned on. On the other hand, if a wire breaking section exists in the gate lines 11a and 11b, pixels 6 connected to a signal line extending from the wire breaking section to one end of the gate line 11b are not turned on, whereby the wire breaking section can be specified.

Furthermore, when short-circuiting of the gate line 11 is inspected, the first inspection gate line 24 is set to "High" to turn on the first inspection TFT 21a, the second inspection gate line 25 is set to "Low" to turn off the first inspection TFT 21b, and the inspection gate line 28 is set to "Low" to turn off the second inspection TFT 22, thereby setting both the ends of the gate line 11b to the open state, and a predetermined image signal is input to the inspection signal lines 26 and 27.

At this time, if the gate lines 11a and 11b are normal, only the TFTs 8 which are electrically connected to the gate line 11a are turned on, and only the pixels 6 connected to the TFTs 8 are turned on. On the other hand, if a short-circuiting section exists in the gate lines 11a and 11b, the pixels 6 connected to the TFTs 8 which are electrically connected to the gate line 11b are also turned on, and thus the short-circuiting section can be specified.

As a result, the same operation and effect as in the first embodiment can be achieved.

The constructions of the second to fifth embodiments may be modified to be suitable for inspecting the gate line 11 as in the sixth embodiment.

Furthermore, by providing the same inspection circuit 29 as in the above-described embodiments to both the gate lines 11 and the signal lines 12, the wire breaking and short-circuiting of these lines may be detected.

Still furthermore, the driver IC 14 for controlling the inputs of the gate lines 11 and the signal lines 12 is used as the driving means. However, even when a driver IC as driving means for the gate lines 11 and a driver IC as driving means for the signal lines 12 are provided separately from each other, the above construction can be applied as well.

The present invention may be applied to other various kinds of display elements such as an organic EL display element, etc., in place of the liquid crystal panel 1.

What is claimed is:

1. A display element comprising:
 a plurality of pixels;
 a plurality of drive switching elements for driving the respective pixels;
 a plurality of signal wires, having first and second end sides, for transmitting signals to the switching elements; and
 an inspection circuit provided to the signal wires for inspecting the signal wires to detect breakage of the signal wires, wherein the inspection circuit includes:
  first inspection switching elements having first and second groups connected to at least the first end side of the signal wires, to supply an inspection signal to the signal wires in a turn-on state; and
  second inspection switching elements connected between (1) the second end side of the signal wires connected to the first group, and (2) the second end sides of the signal wires connected to the second group, to short-circuit the signal wires in a turn-on state;
 wherein during inspection of the signal wires for breakage, the first group of the first inspection switching elements and the second inspection switching elements are turned on, the second group of the first inspection switching elements are turned off, and the drive switching elements are turned on and drive the pixels.

2. The display element according to claim 1, wherein:
 the inspection circuit further includes an inspection circuit to detect short-circuiting of the signal wires; and
 during inspection of short-circuiting of the signal wires, the first group of the first inspection switching elements are turned on, the second group of the first inspection switching elements and the second inspection switching elements are turned off, and the drive switching elements are turned on and drive the pixels.

3. A method for inspecting a display element comprising a plurality of pixels, a plurality of drive switching elements for driving the respective pixels, a plurality of signal wires having first and second end sides, for transmitting signals to the switching elements, and an inspection circuit provided to the signal wires for inspecting the signal wires to detect breakage of the signal wires, the method comprising:
 connecting first inspection switching elements having first and second groups connected to at least the first end side of the signal wires to supply an inspection signal to the signal wires in a turn-on state;
 connecting second inspection switching elements between (1) the second end side of the signal wires to the first group, and (2) the second end side of the signal wires connected to the second group, to short-circuit the signal wires in a turn-on state; and
 inspecting the signal wires for breakage by driving the pixels with the drive switching elements in a state where the first group of the first inspection switching elements and the second inspection switching elements are turned on, the second group of the first inspection switching elements are turned off, and a signal is supplied to the signal wires.

4. The method according to claim 3, further comprising inspecting short-circuiting of the signal wires by driving the pixels by the switching elements in a state where the first group of the first inspection switching elements are turned on, the second group of the first inspection switching elements and the second inspection switching elements are turned off, and a signal is supplied to the signal wires via the first group of the first inspection switching elements.

\* \* \* \* \*